(12) United States Patent
Yamamoto et al.

(10) Patent No.: US 6,547,268 B2
(45) Date of Patent: Apr. 15, 2003

(54) MOTOR VEHICLE SUSPENSION SYSTEM

(75) Inventors: Tadanobu Yamamoto, Fuchu-cho (JP); Susumu Sano, Fuchu-cho (JP); Tadashi Yoshimura, Fuchu-cho (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 10/006,722

(22) Filed: Dec. 10, 2001

(65) Prior Publication Data

US 2002/0074759 A1 Jun. 20, 2002

(30) Foreign Application Priority Data

Dec. 19, 2000 (JP) ........................................ 2000-385215

(51) Int. Cl.[7] ................................................. B60G 7/00
(52) U.S. Cl. ........................ 280/124.133; 280/124.143; 280/124.148; 29/897.2
(58) Field of Search ................... 280/124.128, 124.133, 280/124.143, 124.135, 124.148, 124.145, 124.153; 29/897.2

(56) References Cited

U.S. PATENT DOCUMENTS

| | | | |
|---|---|---|---|
| 4,717,171 A | * | 1/1988 | Kami et al. ............ 280/124.128 |
| 4,815,755 A | | 3/1989 | Takata et al. |
| 4,911,467 A | * | 3/1990 | Alesso et al. ......... 280/124.133 |
| 6,138,357 A | * | 10/2000 | Jones ......................... 29/897.2 |

FOREIGN PATENT DOCUMENTS

DE  295 19 965 U1  *  4/1997

* cited by examiner

Primary Examiner—Peter C. English
(74) Attorney, Agent, or Firm—Nixon Peabody LLP; Donald R. Studebaker

(57) ABSTRACT

A swing arm of a suspension system for supporting the body of a motor vehicle comprises a main swing arm body on which a support portion for supporting a suspension damper is provided, a support member fixed to a rear portion of the main swing arm body and having supporting parts for supporting first to third suspension arms, and a support reinforcing member for reinforcing at least the supporting parts of the support member for supporting the second and third suspension arms. The main swing arm body, the support member and the support reinforcing member are produced by individually press-forming single steel plates and the swing arm is formed by joining the main swing arm body, the support member and the support reinforcing member.

7 Claims, 5 Drawing Sheets

MOTOR VEHICLE SUSPENSION SYSTEM

BACKGROUND OF THE INVENTION AND RELATED ART STATEMENT

The present invention relates to a suspension system for supporting the body of a motor vehicle on its rear wheels.

A conventional rear suspension system of a motor vehicle is disclosed in Japanese Unexamined Patent Publication No. 60-53408, for example. This suspension system comprises a swing arm extending in a longitudinal direction of the vehicle body and three independent suspension arms (lateral links) extending in a lateral direction of the vehicle body. One end of the swing arm is attached to the vehicle body in such a way that the swing arm can swing up and down while the other end of the swing arm is arranged such that it supports a wheel support member and transmits a force exerted in the longitudinal direction and a torque exerted in a turning direction of a wheel from the wheel support member to the swing arm. One end of each suspension arm is attached to the wheel support member while the other end is attached to the vehicle body, allowing each suspension arm to swing on its ends. Attaching points of the three suspension arms to the wheel support member are arranged such that they do not line up in a vertical plane oriented parallel to the longitudinal direction of the vehicle body. With this arrangement, the force (load) exerted in the longitudinal direction and the torque exerted in the wheel turning direction entered from the wheel are supported by the swing arm.

The swing arm extending in the longitudinal direction of the vehicle body carries the load exerted in the longitudinal direction and the torque entered from the wheel as well as a load exerted in the lateral direction of the vehicle body from the suspension arms attached to the wheel support member and a vertical load exerted from a suspension damper. Since the swing arm has to withstand all such loads, it has conventionally been a casting having a specific thickness, resulting in an increase in the physical size of the swing arm, an increase in unsprung weight, and a difficulty in improving ride comfort of the vehicle.

SUMMARY OF THE INVENTION

The invention has been made in the light of the foregoing problems of the prior art. Accordingly, it is an object of the invention to provide a suspension system which makes it possible to effectively decrease unsprung weight of a motor vehicle without producing such a problem as cracking of a swing arm.

According to the invention, a suspension system of a motor vehicle comprises a swing arm which is mounted to extend in a longitudinal direction of the vehicle body and has a fixing part for fixing a rear wheel support member, the swing arm including a main swing arm body mounted to extend in the longitudinal direction of the vehicle body with a forward end of the main swing arm body supported by the vehicle body, the main swing arm body having a support portion for supporting a suspension damper, a support member fixed to a rear portion of the main swing arm body, the support member having a supporting part for supporting a suspension arm, and a support reinforcing member for reinforcing at least the supporting part of the support member for supporting the suspension arm, wherein the main swing arm body, the support member and the support reinforcing member are produced by individually press-forming single steel plates and the swing arm is formed by joining the main swing arm body, the support member and the support reinforcing member.

This construction makes it possible to produce a lightweight, high-strength swing arm by joining the main swing arm body, the support member and the support reinforcing member which are made by individually press-forming single steel plates. Even if the wall thicknesses of the main swing arm body, the support member and the support reinforcing member are decreased, the main swing arm body supports a vertical load exerted from the suspension damper in a stable fashion while the support member and the support reinforcing member support a load exerted in a lateral direction of the vehicle body from the suspension arm in a stable fashion.

These and other objects, features and advantages of the invention will become more apparent upon reading the following detailed description in conjunction with the accompanying drawings.

DETAILED DESCRIPTION OF THE INVENTION

Figure 1:
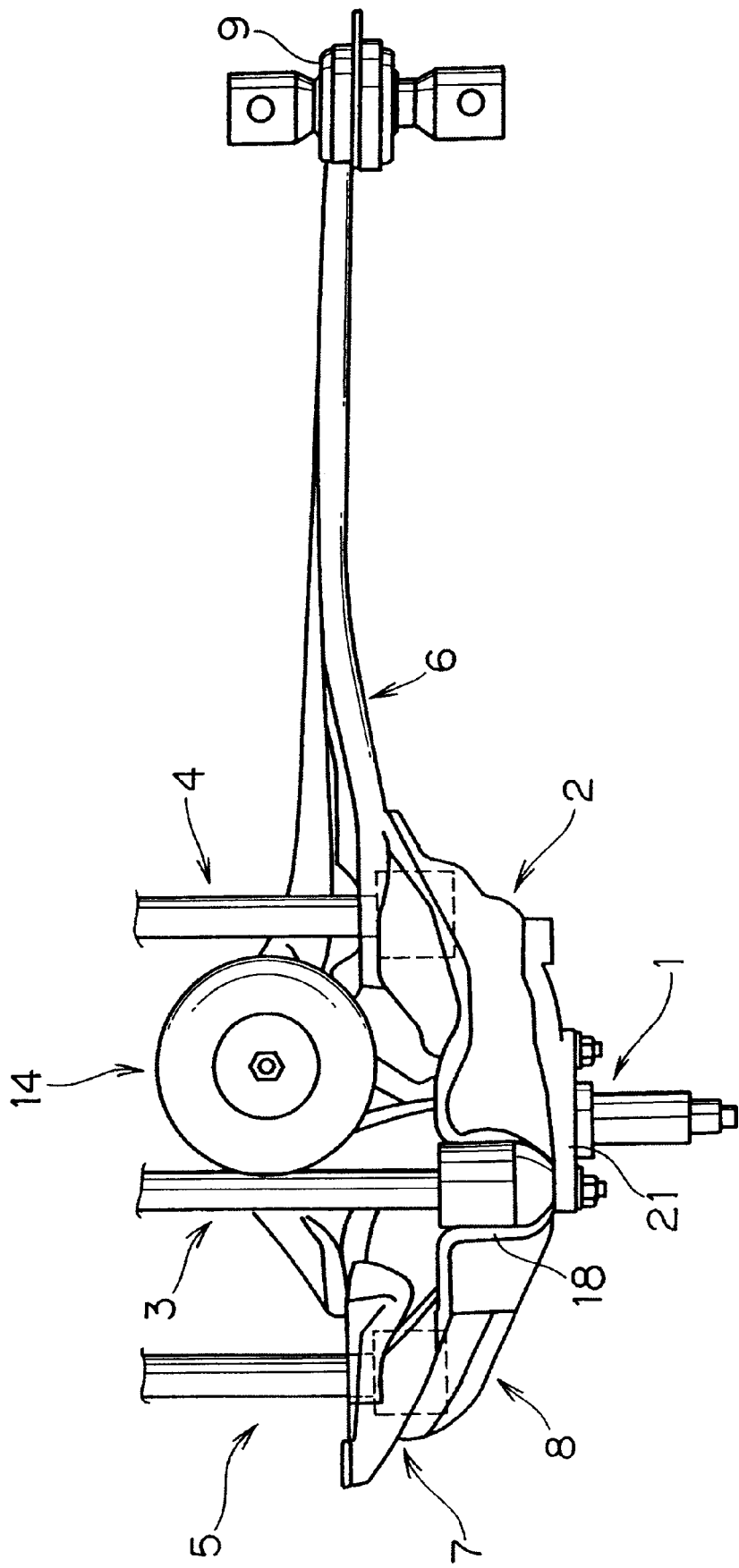
FIG. 1 is a plan view showing a suspension system of a motor vehicle according to an embodiment of the invention.

FIG. 1 is a plan view showing a suspension system of a motor vehicle according to an embodiment of the invention. This suspension system comprises a swing arm 2 extending in a longitudinal direction of the vehicle body with a fixing part 21 for a rear wheel support member 1 provided on the swing arm 2, first to third suspension arms 3–5 extending in a lateral direction of the vehicle body to support the swing arm 2, and a suspension damper 14 whose bottom end is supported by the swing arm 2.

Figure 2:
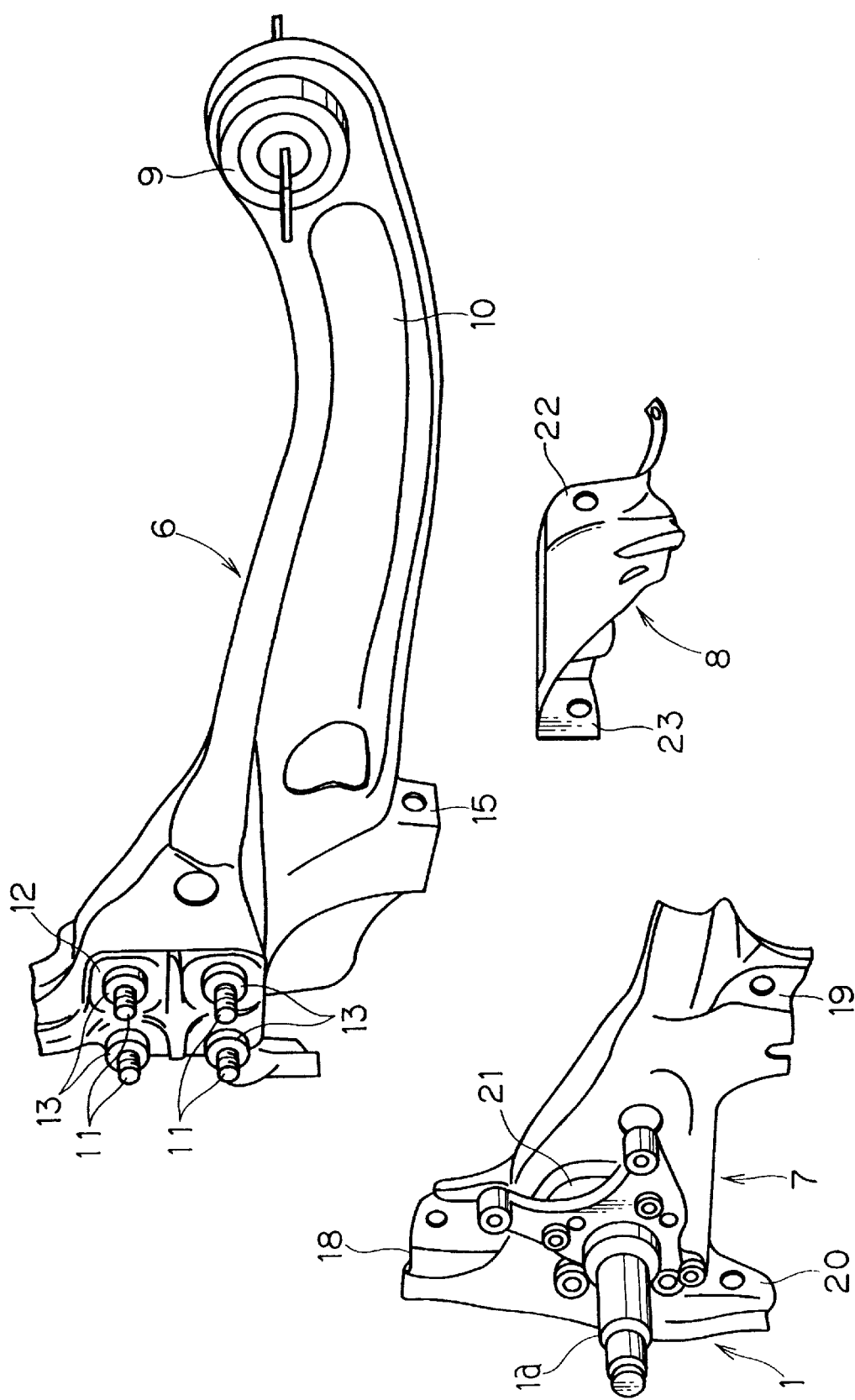
FIG. 2 is an exploded perspective view showing a specific construction of a swing arm.

As illustrated in FIG. 2, the swing arm 2 includes a main swing arm body 6 having a specific length and extending in the longitudinal direction of the vehicle body, a support member 7 fixed to a rear outside surface of the main swing arm body 6, a support reinforcing member 8 for reinforcing at least supporting parts for the second and third suspension arms 4, 5 provided on the support member 7.

The main swing arm body 6 extending in the longitudinal direction of the vehicle body is a press-formed steel plate part having a specific vertical dimension (height). A bush 9 connected to the vehicle body is provided at a forward end of the main swing arm body 6 and a bead 10 recessed to the inside of the vehicle body is formed in a wall surface of the main swing arm body 6. At a rear portion of the main swing arm body 6, there are formed mounting bases 12 for fixing bolts 11. The aforementioned support member 7 is placed on the outside of the fixing bolt mounting bases 12 with gap-creating collars 13 fitted on the individual fixing bolts 11 between the fixing bolt mounting bases 12 and the support member 7. The support member 7 and the rear wheel support member 1 together are fixed to the swing arm 2 by the fixing bolts 11. The rear wheel support member 1 includes an axle 1a.

Figure 3:
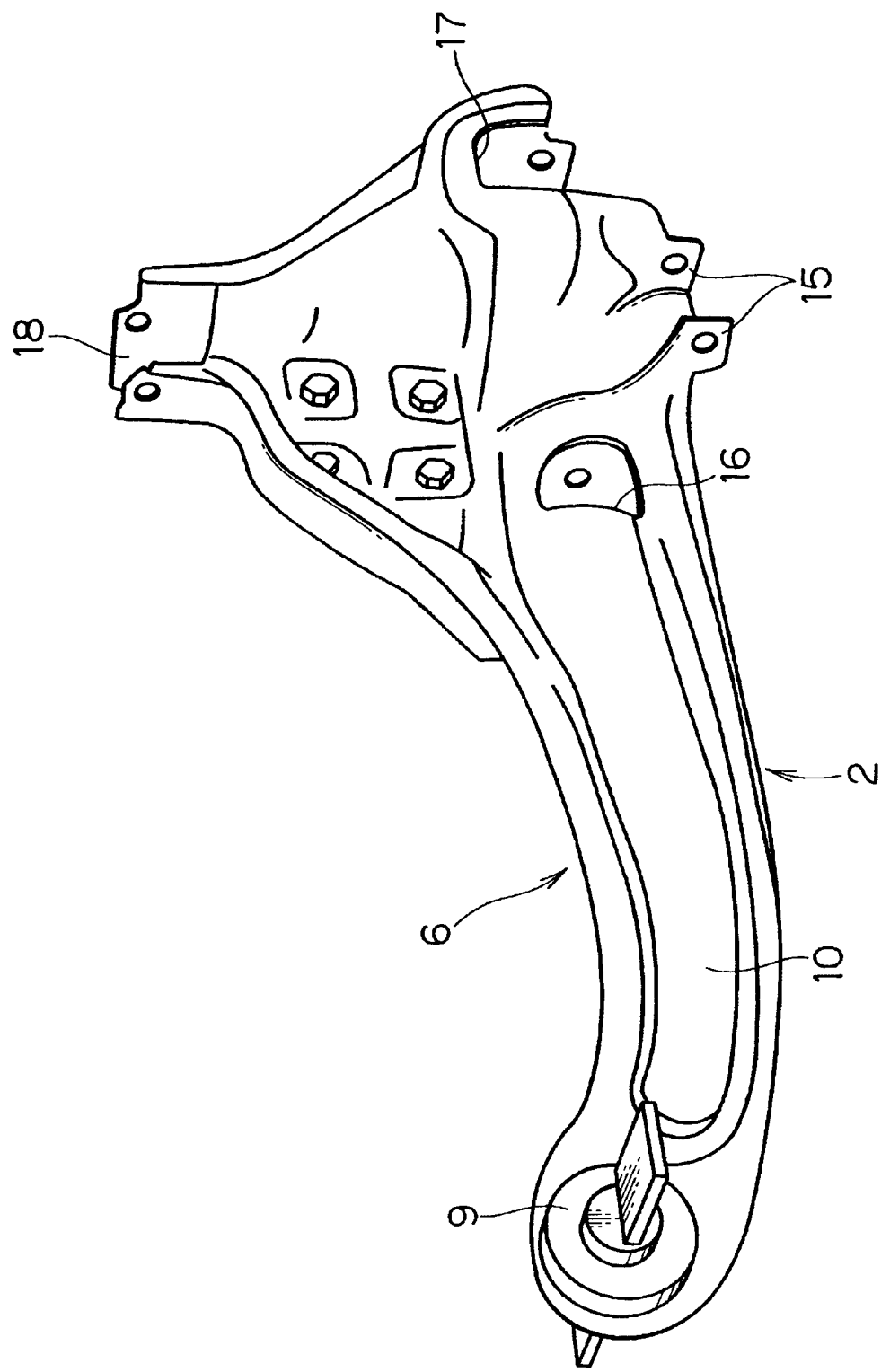
FIG. 3 is a perspective view of the swing arm showing its inside structure.

As shown in FIG. 3, the main swing arm body 6 has a damper support portion 15 having generally a U-shaped cross section for supporting the bottom end of the suspension damper 14. The damper support portion 15 is provided beneath the fixing bolt mounting bases 12. The main swing arm body 6 also has cutouts 16 and 17 for passing the second and third suspension arms 4, 5 beneath the fixing bolt mounting bases 12 on their forward and rear sides, respectively.

The support member 7 is a press-formed steel plate part whose size and shape are appropriate for covering a rear portion of the outside surface of the main swing arm body 6, as shown in FIG. 2. At an upper end portion of the support member 7, there is formed a first supporting part 18 having generally a U-shaped cross section for supporting an end of the first suspension arm 3. Also, at lower front and rear portions of the support member 7, there are formed second and third supporting parts 19, 20 for supporting ends of the second and third suspension arms 4, 5, respectively. The aforementioned fixing part 21 for the rear wheel support member 1 is provided at a central portion of the support member 7.

The support reinforcing member 8 is a press-formed steel plate part shaped to cover a lower portion of the outside surface of the main swing arm body 6 between the second and third supporting parts 19, 20 provided at the lower front and rear portions of the support member 7. At forward and rear ends of the support reinforcing member 8, there are formed second and third supporting parts 22, 23 for supporting the ends of the second and third suspension arms 4, 5 together with the second and third supporting parts 19, 20 of the support member 7, respectively.

Figure 4:
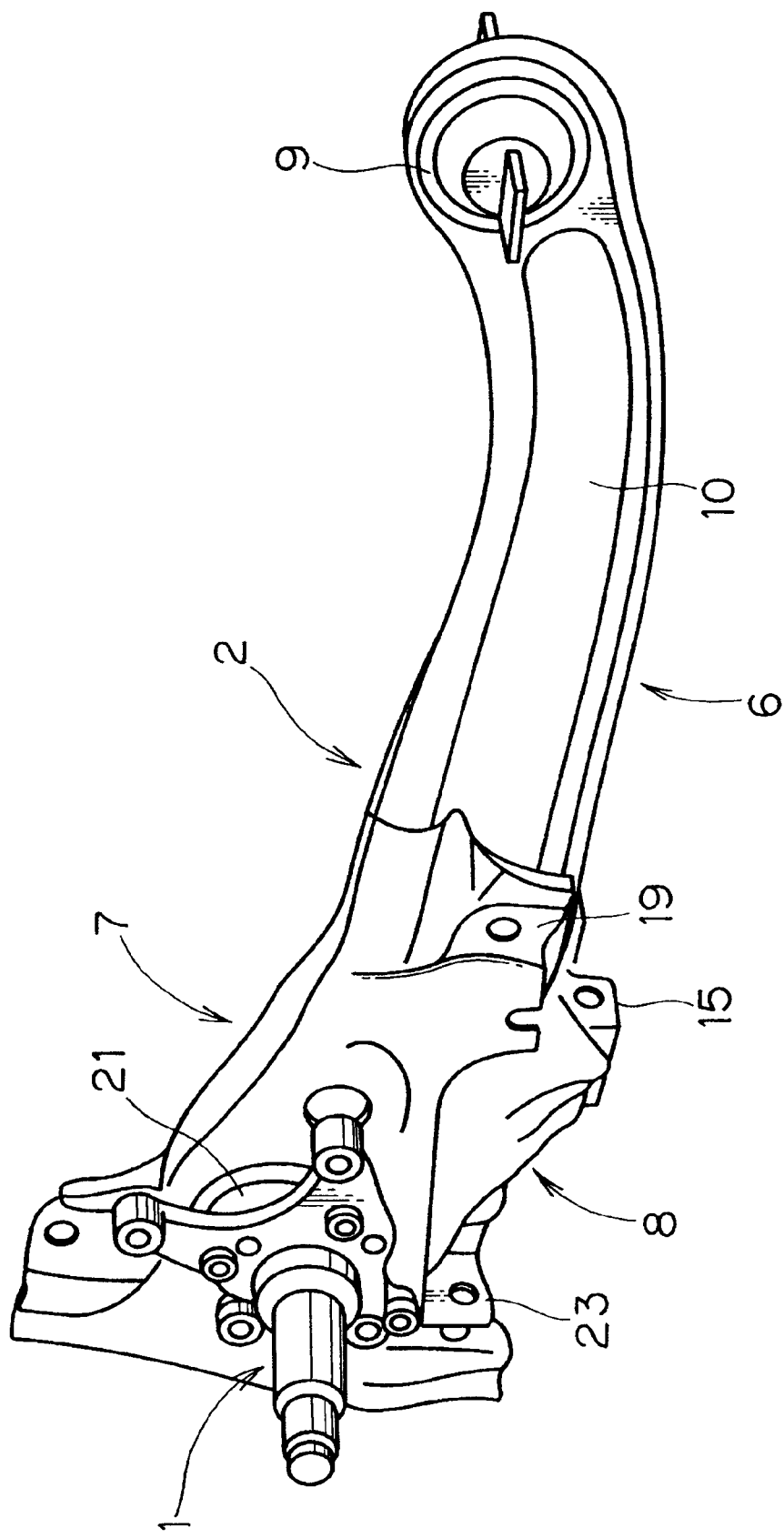
FIG. 4 is a perspective view showing the construction of the swing arm.

In the aforementioned construction, the support reinforcing member 8 is placed over the lower portion of the outside surface of the main swing arm body 6, the support member 7 is placed just above the support reinforcing member 8 with the gap-creating collars 13 fitted between the main swing arm body 6 and the support member 7 (FIG. 5), and the main swing arm body 6, the support member 7 and the support reinforcing member 8 are joined together into a single structure by spot welding, for example. The swing arm 2 comprising the main swing arm body 6, the support member 7 and the support reinforcing member 8 as shown in FIG. 4 is formed in this fashion.

Figure 5:
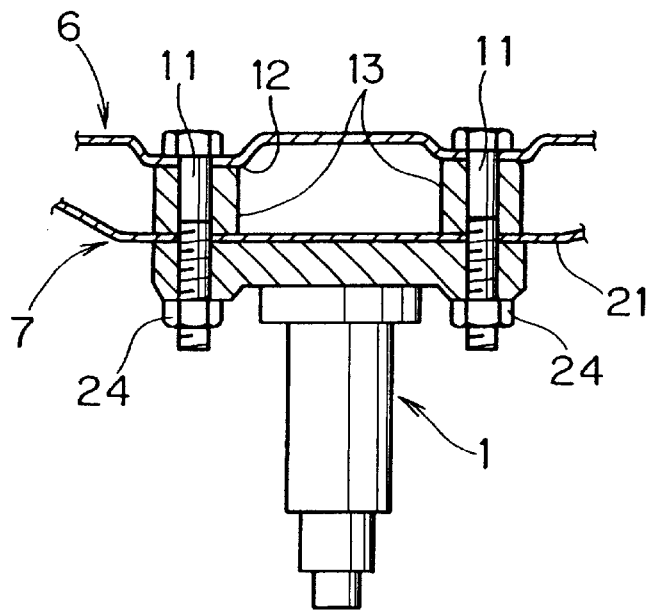
FIG. 5 is a cross-sectional plan view showing how a rear wheel support member is fixed.

As nuts 24 are screwed onto the fixing bolts 11, the rear wheel support member 1 is fixed to the fixing part 21 of the support member 7 as shown in FIG. 5. The bush 9 provided at the forward end of the main swing arm body 6 is supported by a support bracket (not shown) provided on the vehicle frame, and the bottom end of the suspension damper 14 is attached to the damper support portion 15 of the main swing arm body 6.

In this suspension system, the end of the first suspension arm 3 is supported by the first supporting part 18 provided at the upper end portion of the support member 7. Also, the end of the second suspension arm 4 passed through the cutout 16 in the main swing arm body 6 is supported by the second supporting parts 19, 22 provided at the lower front portions of the support member 7 and the support reinforcing member 8, and the end of the third suspension arm 5 passed through the cutout 17 is supported by the third supporting parts 20, 23 provided at the lower rear portions of the support member 7 and the support reinforcing member 8. With this arrangement, the swing arm 2 is supported by the vehicle body via the bush 9, the suspension damper 14 and the first to third suspension arms 3, 4, 5.

The motor vehicle suspension system of the foregoing embodiment comprises the swing arm 2 mounted along the longitudinal direction of the vehicle body, the swing arm 2 having the fixing part 21 for fixing the rear wheel support member. 1. As stated earlier, the swing arm 2 includes the main swing arm body 6 mounted along the longitudinal direction of the vehicle body with the forward end of the main swing arm body 6 connected to the vehicle body, the main swing arm body 6 having the damper support portion 15 for supporting the suspension damper 14, the support member 7 fixed to the rear portion of the main swing arm body 6 and having the supporting parts 18, 19, 20 for supporting the first to third suspension arms 3, 4, 5, and the support reinforcing member 8 for reinforcing at least the supporting parts 19, 20 of the support member 7 for supporting the second and third suspension arms 4, 5. Since the main swing arm body 6, the support member 7 and the support reinforcing member 8 are made by individually press-forming single steel plates and the swing arm 2 is formed by joining the main swing arm body 6, the support member 7 and the support reinforcing member 8 together, the invention produces an advantage that the weight of the swing arm 2 can be decreased without causing such a problem as cracking in the swing arm 2.

If a vertical load entered from the suspension damper 14 and loads exerted in the lateral direction of the vehicle body from the first to third suspension arms 3, 4, 5 are carried by a conventional swing arm produced by casting, a major problem encountered would be cracking of the swing arm caused by concentration of stress. For this reason, it has been necessary for the swing arm of the prior art to have an increased wall thickness, resulting in an increase in the weight of the swing arm as well as in its manufacturing cost.

In contrast, since the damper support portion 15 for the suspension damper 14 is provided in the main swing arm body 6 itself, the supporting parts 18, 19, 20 for the first to third suspension arms 3, 4, 5 are provided in the support member 7 and the support member 7 is reinforced by the support reinforcing member 8 in the suspension system of the present embodiment, no loads are exerted on the main swing arm body 6 in the lateral direction of the vehicle body and no vertical load is exerted on the support member 7. Therefore, even if the wall thicknesses of the main swing arm body 6 and the support member 7 are decreased, cracks would not occur in these components due to stress concentration and the suspension system can support the aforementioned individual loads in a stable fashion. The swing arm 2 of the embodiment has a lightweight structure as it is formed by joining the main swing arm body 6, the support member 7 and the support reinforcing member 8 which are made by individually press-forming the steel plates as stated above. This lightweight structure confers such advantages that it helps reduce the unsprung weight of the motor vehicle and improve its ride comfort in an effective manner.

In the foregoing embodiment, the mounting bases 12 for the fixing bolts 11 for fixing the rear wheel support member 1 are provided at the rear portion of the main swing arm body 6 and the fixing part 21 for fixing the rear wheel support member 1 is provided on the support member 7. A double wall structure formed of the fixing bolt mounting bases 12 of the main swing arm body 6 and the fixing part 21 of the support member 7 produces such an advantage that it can support a load exerted in the longitudinal direction by a rear wheel and its torque in a stable fashion.

In particular, since the gap-creating collars 13 are fitted between the fixing bolt mounting bases 12 on the main swing arm body 6 and the fixing part 21 for the rear wheel support member 1 provided on the support member 7 in the foregoing embodiment as can be seen from FIG. 5, there is created a gap as wide as the length of the collars 13 between the fixing bolt mounting bases 12 and the fixing part 21 for the rear wheel support member 1. This construction makes it possible to fix the rear wheel support member 1 in a reliable manner without the need for so high a dimensional accuracy of the main swing arm body 6 and the support member 7.

More specifically, if the gap between the mounting bases 12 for the fixing bolts 11 and the fixing part 21 for the rear wheel support member 1 does not exactly match the length of the collars 13 due to a rather low dimensional accuracy of the main swing arm body 6 and the support member 7, a solution is obtained by tightening the nuts 24 onto the fixing bolts 11 so that the gap corresponding to the length of the collars 13 is created between the mounting bases 12 for the fixing bolts 11 and the fixing part 21 for the rear wheel support member 1 and the rear wheel support member 1 can be firmly fixed to the fixing part 21. In this construction, even if the dimensional accuracy of the main swing arm body 6 and the support member 7 is insufficient, it will not produce such problems that the nuts 24 can not be firmly tightened onto the fixing bolts 11 or the nuts 24 loosen due to deformation of the fixing bolt mounting bases 12 or of the fixing part 21 for the rear wheel support member 1. Thus, the construction of the embodiment produces such an advantage that the rear wheel support member 1 can be fixed to the fixing part 21 of the support member 7 in a reliable fashion.

Figure 6:
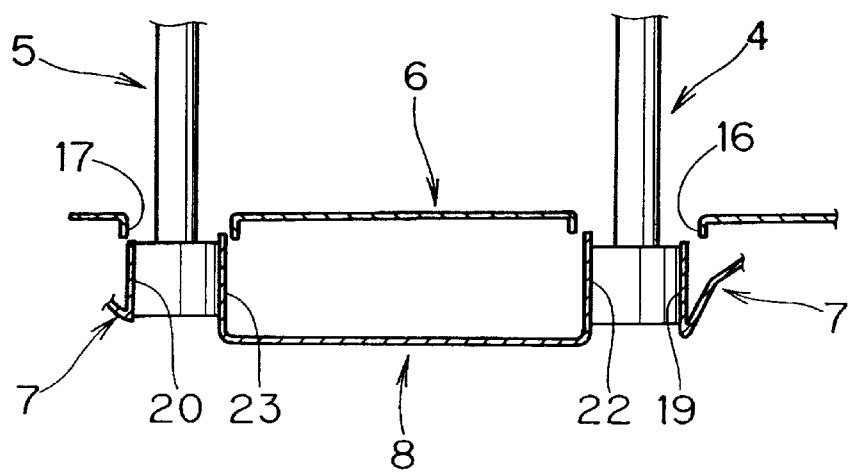
FIG. 6 is a cross-sectional plan view showing how suspension arms are supported.

Furthermore, since the ends of the second and third suspension arms 4, 5 are supported at forward and rear sides by the second and third supporting parts 19, 20 provided on the support member 7 and the second and third supporting parts 22, 23 provided on the support reinforcing member 8, respectively, as shown in FIG. 6 and the cutouts 16, 17 for passing the ends of the second and third suspension arms 4, 5 in between the second supporting parts 19, 22 and the third supporting parts 20, 23 are formed in the main swing arm body 6, the ends of the second and third suspension arms 4, 5 can be supported in a more reliable fashion by the support member 7 and the support reinforcing member 8.

Summing up the aforementioned descriptions, the present invention relates to a suspension system of a motor vehicle comprises a swing arm which is mounted to extend in a longitudinal direction of the vehicle body and has a fixing part for fixing a rear wheel support member, the swing arm including a main swing arm body mounted to extend in the longitudinal direction of the vehicle body with a forward end of the main swing arm body supported by the vehicle body, the main swing arm body having a support portion for supporting a suspension damper, a support member fixed to a rear portion of the main swing arm body, the support member having a supporting part for supporting a suspension arm, and a support reinforcing member for reinforcing at least the supporting part of the support member for supporting the suspension arm, wherein the main swing arm body, the support member and the support reinforcing member are produced by individually press-forming single steel plates and the swing arm is formed by joining the main swing arm body, the support member and the support reinforcing member.

This construction makes it possible to produce a lightweight, high-strength swing arm by joining the main swing arm body, the support member and the support reinforcing member which are made by individually press-forming single steel plates. Even if the wall thicknesses of the main swing arm body, the support member and the support reinforcing member are decreased, the main swing arm body supports a vertical load exerted from the suspension damper in a stable fashion while the support member and the support reinforcing member support a load exerted in a lateral direction of the vehicle body from the suspension arm in a stable fashion.

In one aspect of the invention, a mounting base for a fixing bolt for fixing the rear wheel support member is provided at a rear portion of the main swing arm body, and the fixing part for the rear wheel support member is provided on the support member.

In this construction, a double wall structure formed of the fixing bolt mounting base provided on the main swing arm body and the fixing part for the rear wheel support member provided on the support member supports a load exerted in the longitudinal direction by a rear wheel and its torque in a stable fashion.

In another aspect of the invention, a collar is fitted between the mounting base for the fixing bolt provided on the main swing arm body and the fixing part for the rear wheel support member provided on the support member, so that a gap as wide as the length of the collar is created between the mounting base for the fixing bolt and the fixing part for the rear wheel support member.

In this construction, even if there are variations in the clearance between the mounting base for the fixing bolt provided on the main swing arm body and the fixing part for the rear wheel support member provided on the support member due to insufficient dimensional accuracy of the main swing arm body and the support member, the rear wheel support member can be fixed to the fixing part in a reliable fashion by securing the rear wheel support member to the fixing part by the fixing bolt with a gap corresponding to the length of the collar created between the mounting base and the fixing part.

In still another aspect of the invention, an end of the suspension arm is supported from both sides by the supporting part provided on the support member and a supporting part provided on the support reinforcing member, and a cutout for passing the end of the suspension arm in between the supporting parts is formed in the main swing arm body.

In this construction, the end of the suspension arm passed through the cutout in the main swing arm body into the supporting parts is supported by the support member and the support reinforcing member in a reliable fashion.

Overall, the swing arm of the invention can be produced at relatively a low manufacturing cost by joining the main swing arm body, the support member and the support reinforcing member which are made by individually press-forming single steel plates. This lightweight structure of the swing arm confers such advantages that it helps reduce the unsprung weight of the motor vehicle and improve its ride comfort in an effective manner.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A suspension system of a motor vehicle, said suspension system comprising a swing arm which is mounted to extend in a longitudinal direction of a vehicle body and has a fixing part for fixing a rear wheel support member, said swing arm including:

a main swing arm body mounted to extend in the longitudinal direction of the vehicle body with a forward end of the main swing arm body supported by the vehicle body, the main swing arm body having a support portion for supporting a suspension damper;

a support member fixed to a rear portion of the main swing arm body, the support member having a supporting part for supporting a suspension arm; and a support reinforcing member for reinforcing at least the supporting part of the support member for supporting the suspension arm;

wherein the main swing arm body, the support member and the support reinforcing member are made of individually press-formed single steel plates and said swing arm is formed by joining the main swing arm body, the support member and the support reinforcing member.

2. The suspension system according to claim 1, wherein a mounting base for a fixing bolt for fixing the rear wheel support member is provided at a rear portion of the main swing arm body, and the fixing part for the rear wheel support member is provided on the support member.

3. The suspension system according to claim 2, wherein a collar is fitted between the mounting base for the fixing bolt provided on the main swing arm body and the fixing part for the rear wheel support member provided on the support member, so that a gap as wide as the length of the collar is created between the mounting base for the fixing bolt and the fixing part for the rear wheel support member.

4. The suspension system according to claim 3, wherein an end of the suspension arm is supported from both sides by the supporting part provided on the support member and a supporting part provided on the support reinforcing member, and a cutout receiving the end of the suspension arm is formed in the main swing arm body.

5. The suspension system according to claim 2, wherein an end of the suspension arm is supported from both sides by the supporting part provided on the support member and a supporting part provided on the support reinforcing member, and a cutout receiving the end of the suspension arm is formed in the main swing arm body.

6. The suspension system according to claim 1, wherein an end of the suspension arm is supported from both sides by the supporting part provided on the support member and a supporting part provided on the support reinforcing member, and a cutout receiving the end of the suspension arm is formed in the main swing arm body.

7. A suspension system of a motor vehicle, said suspension system comprising:

a swing arm which is mounted to extend in a longitudinal direction of a vehicle body and has a fixing part for fixing a rear wheel support member, said swing arm including:

a press-formed main swing arm body, made of a steel plate, mounted to extend in the longitudinal direction of the vehicle body with a forward end of the main swing arm body supported by the vehicle body, the main swing arm body having a support portion for supporting a suspension damper;

a press-formed support member, made of a single steel plate, fixed to a rear portion of the main swing arm body, the support member having a supporting part for supporting a suspension arm; and a press-formed support reinforcing member, made of a single steel plate, for reinforcing at least the supporting part of the support member for supporting the suspension arm; wherein said swing arm is formed by joining the main swing arm body, the support member and the support reinforcing member.

* * * * *